United States Patent Office 3,296,333
Patented Jan. 3, 1967

3,296,333
THERMAL INSULATING COMPOSITION COMPRISING A MIXTURE OF A PHENOL-ALDEHYDE RESIN AND POLYPROPYLENE
John W. White, Jr., Costa Mesa, Calif., assignor to Whittaker Corporation, a corporation of California
No Drawing. Filed Apr. 22, 1963, Ser. No. 274,814
7 Claims. (Cl. 260—848)

The present invention relates to a composition which is particularly useful in the fabrication of ablative products and which is generally useful as a thermal insulating compound. Ablative materials having thermal insulating properties are widely used in environments which are subjected to high temperature, high velocity gas streams, e.g., the exhausts of heat engines.

Various ceramic materials as well as phenolic resins have been used as thermal insulating and ablative materials. However, in general, it has long been recognized that it would be desirable to substitute a lower density material for these compositions for use in aircraft and the like. Furthermore, the phenolic resins are not completely satisfactory because they are substantially inflexible and have a relatively high char rate.

Therefore, it is a principal object of the present invention to provide a low density, relatively flexible thermal insulation composition which has a relatively low char rate.

It is another object of the present invention to provide a thermal insulation composition comprising a polyolefin and a phenolic resin.

It is a still further object of the present invention to provide a thermal insulation composition comprising polypropylene and a phenol-aldehyde resin.

It is another object of the present invention to provide thermal insulation and ablative materials and articles comprising the composition of the present invention as well as the process of making these materials and articles.

Other objects and advantages of the present invention, it is believed, will be apparent from the following detailed description of specific embodiments thereof.

Briefly, the composition of the present invention comprises, broadly, a combination of a polyolefin and a phenolic resin. In a preferred embodiment, the composition of the present invention comprises polypropylene and a phenol-aldehyde resin. For use as an ablative material, it has been found preferable to combine the polypropylene and phenol-aldehyde resin in approximately equal proportions by weight. However, these proportions may be varied somewhat depending upon the desired properties of the ablative material. For example, flexibility may be increased by combining about 60% by weight polypropylene with about 40% by weight phenol-aldehyde resin while rigidity may be increased by combining about 40% by weight polypropylene with about 60% by weight phenol-aldehyde resin. However, since polypropylene is a thermoplastic material, the proportion of this material should not be increased to an extent such that undesirable insulation properties result. The desired insulation properties will, of course, depend upon the particular environment in which the material is used.

The present invention is further illustrated by the following examples in which all parts are by weight unless otherwise indicated.

*Example 1*

The following composition was prepared:

Bakelite BRR–5655 phenol-aldehyde resin _____ 45
Hexamethylene tetramine _____ 5
Polypropylene _____ 50

*Example 2*

The following compositions were prepared:

| | | |
|---|---|---|
| Plyophen 169 (mfg. by Reichhold Chemicals) phenol-aldehyde resin | 50 | 40 |
| Polypropylene | 50 | 60 |

*Example 3*

The following composition was prepared:

SC–1013 (mfg. by Monsanto) phenol-aldehyde resin _____ 50
Polypropylene _____ 50

*Example 4*

The following compositions were prepared:

| | | | |
|---|---|---|---|
| SC–1008 (mfg. by Monsanto) phenol-aldehyde resin | 60 | 50 | 40 |
| Polypropylene | 40 | 50 | 60 |

*Example 5*

The following compositions were prepared:

| | | | |
|---|---|---|---|
| V–204 (mfg. by Barrett Chemicals) phenol-aldehyde resin | 50 | 60 | 40 |
| Polypropylene | 50 | 40 | 60 |

The polypropylene in each of the foregoing examples was Profax 6501. In each case, the materials were combined in powdered form. Each of these compositions was then molded at 350° F. under a pressure of 2,000 p.s.i. for one-half hour. The molded articles were found to have excellent thermal insulation properties. In addition, the density of the compositions of the present invention is about 20% lower than the nylon phenolic compounds which have previously been used as ablative materials. Still further, the materials of the present invention have lower char rates than asbestos-phenolics and nylon-phenolics, as well as lower moisture absorption, better resistance to weathering and better impact resistance than nylon-phenolics.

The polypropylene and phenol-aldehyde compositions of the present invention may be made by combining powdered materials or in any other convenient manner. Thus, since polypropylene does not require expensive processing such as the low temperature grinding of nylon to produce a powdered product, the materials of the present invention are relatively inexpensive.

*Example 6*

The 50–50 material of Example 5 was formed into a tubular article according to the molding procedure previously described and compared with a nylon-phenolic material by subjecting each material to a high heat flux. More particularly, this art recognized test comprised subjecting the materials to a flame temperature of 6,400° F., pressures of 200–300 p.s.i. and gas velocity of 250 ft. per second in a nozzle-type test apparatus. In this test, a performance rating of 100 represents a standard and the lower the performance rating, the beter the performance of the material.

In this test, a nylon-phenolic material having a density of 75 pounds per cubic foot achieved a performance rating of 60–63 whereas the material of the present invention which had a density of 62 pounds per cubic foot achieved a performance rating of 49. Thus, the composition of the present invention was significantly superior to the nylon-phenolic material.

In general, any of the phenol-aldehyde resins which have previously been used in thermal insulation materials may be combined with polypropylene to form an insulation material coming within the scope of the present invention. Thus, the phenyl-aldehyde resins used in the present invention may be prepared from various phenyls, such as phenol, cresol, xylenol, resorcinol, phenyl phenol or butyl phenol, and various aldehydes, such as formaldehyde and furfuraldehyde. The resins prepared primarily from phenol and formaldehyde are preferred. The phenol-aldehyde resins used in the present invention should be convertible to an insoluble, infusible state when heated.

Although it is preferred to prepare the compositions of the present invention from powdered materials, other methods may be used. For example, polypropylene fabrics may be impregnated with the phenol-aldehyde resin. The impregnated fabric may then be granulated for use as a molding compound or may be used as an insulating tape.

Having fully described the present invention, it is to be understood that it is not to be limited to the specific details set forth, but is of the full scope of the appended claims.

I claim:

1. A thermal insulating composition capable of withstanding high heat fluxes consisting essentially of about 40 to about 60% by weight of a phenol-aldehyde resin and about 40 to about 60% by weight polypropylene, based on the total weight of said resin and said polypropylene.

2. A thermal insulating composition capable of withstanding high heat fluxes consisting essentially of about 50% by weight of a phenol-aldehyde resin and about 50% by weight polypropylene, based on the total weight of said resin and said polypropylene.

3. A shaped article having ablative and thermal insulating properties consisting essentially of about 40 to about 60% by weight of a phenol-aldehyde resin and about 40 to about 60% by weight polypropylene, based on the total weight of said polypropylene and said resin.

4. A shaped article having ablative and thermal insulating properties consisting essentially of about 50% by weight of a phenol-aldehyde resin and about 50% polypropylene, based on the total weight of said resin and said polypropylene.

5. The process of improving the flexibility and reducing the density of a phenol-aldehyde resin thermal insulating composition consisting essentially of admixing therewith polypropylene, wherein said polypropylene is present in an amount of from about 40 to about 60% by weight and said phenol-aldehyde resin is present in an amount of about 40 to about 60% by weight, based on the total weight of said resin and said polypropylene.

6. The process of claim 5 wherein said polypropylene and said phenol-aldehyde resin are present in substantially equal amounts.

7. A process for improving the flexibility and reducing the density of a phenol-aldehyde resin thermal insulating composition which consists essentially of admixing therewith about 40 to about 60% by weight polypropylene based on the combined weights of said polypropylene and said phenol-aldehyde resin, and molding said composition at a temperature of about 350° F. and under a pressure of about 2,000 p.s.i.

References Cited by the Examiner

UNITED STATES PATENTS

| | | | |
|---|---|---|---|
| 2,137,568 | 11/1938 | Cserny | 260—848 |
| 2,554,259 | 5/1951 | Mikeska et al. | 260—897 |
| 2,968,641 | 1/1961 | Roberts et al. | 260—848 |
| 3,043,787 | 7/1962 | Bonvicini et al. | 260—848 |
| 3,097,105 | 7/1963 | Edmonds | 260—848 |

MURRAY TILLMAN, *Primary Examiner.*

J. C. BLEUTGE, *Assistant Examiner.*